(12) United States Patent
Ko

(10) Patent No.: US 6,769,725 B2
(45) Date of Patent: Aug. 3, 2004

(54) SHIELD PADS FOR VEHICLE DOORS AND SIDES

(76) Inventor: Gordon Ko, 10 Pala Mesa Dr., Phillips Ranch, CA (US) 91766

( * ) Notice: Subject to any disclaimer, the term of this patent is extended or adjusted under 35 U.S.C. 154(b) by 0 days.

(21) Appl. No.: 10/061,569

(22) Filed: Feb. 1, 2002

(65) Prior Publication Data

US 2003/0146630 A1 Aug. 7, 2003

(51) Int. Cl.[7] .............................................. B60R 19/42
(52) U.S. Cl. ..................... 293/128; 296/97.5; 296/97.7; 160/370.21
(58) Field of Search ............................ 296/95.1, 97.5, 296/97.7, 97.8, 207; 293/126, 128; 160/370.21

(56) References Cited

U.S. PATENT DOCUMENTS

| | | | | |
|---|---|---|---|---|
| 2,646,118 A | * | 7/1953 | Berty ........................ 160/369 |
| 2,734,765 A | * | 2/1956 | Henderson et al. ............ 16/82 |
| 4,708,380 A | * | 11/1987 | Cruz .......................... 280/770 |
| 4,810,013 A | * | 3/1989 | Spears ........................ 280/770 |
| 4,810,015 A | * | 3/1989 | McNeil ....................... 150/166 |
| 4,974,892 A | * | 12/1990 | Huard ......................... 280/770 |
| 5,050,925 A | * | 9/1991 | Brown ........................ 293/128 |
| 5,072,979 A | * | 12/1991 | Swinton ...................... 280/770 |
| 5,162,139 A | * | 11/1992 | Gomez et al. ............. 248/206.3 |
| 5,320,392 A | | 6/1994 | Hart |
| 5,553,908 A | * | 9/1996 | Shink ..................... 160/370.21 |
| 6,062,617 A | | 5/2000 | Marks |
| 6,155,329 A | * | 12/2000 | Hwang et al. ............... 160/329 |
| 6,254,170 B1 | | 7/2001 | Farmer et al. |

* cited by examiner

*Primary Examiner*—D. Glenn Dayoan
*Assistant Examiner*—Patricia Engle
(74) *Attorney, Agent, or Firm*—Boniard I. Brown

(57) ABSTRACT

Shield pads are removably attachable to a vehicle side and doors to protect against dents and scratches, as by impacts by doors of adjacent vehicles. The shield pads are preferably detachably mounted by one or more suction cups on each pad. Spaced-apart straps extend between the shield pads. An elastic strap extends from one shield pad and is detachably attached when the shield pads are rolled up together. Ease of handling, maneuvering, rolling up and storage of the shield pads, are provided.

2 Claims, 2 Drawing Sheets

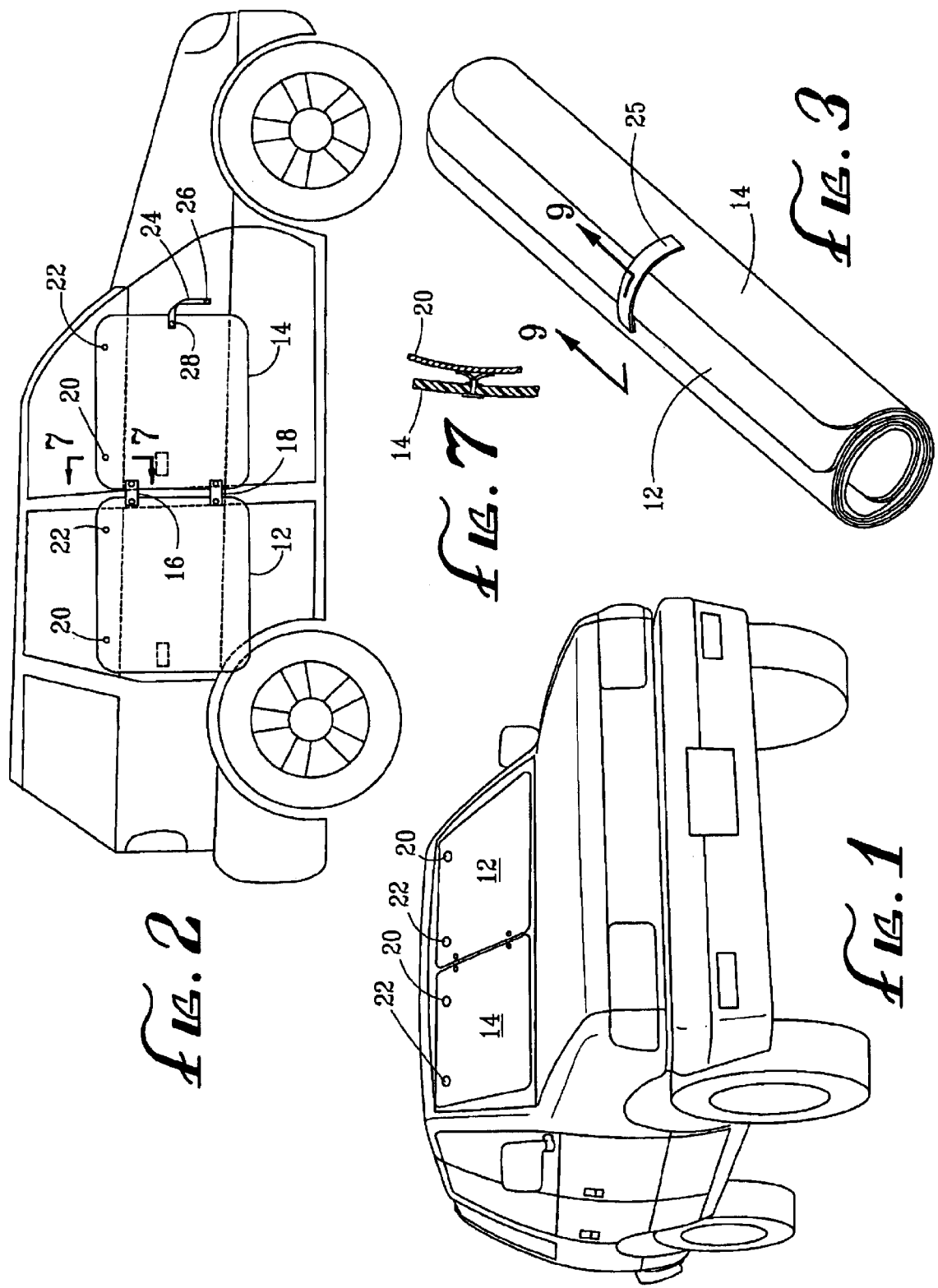

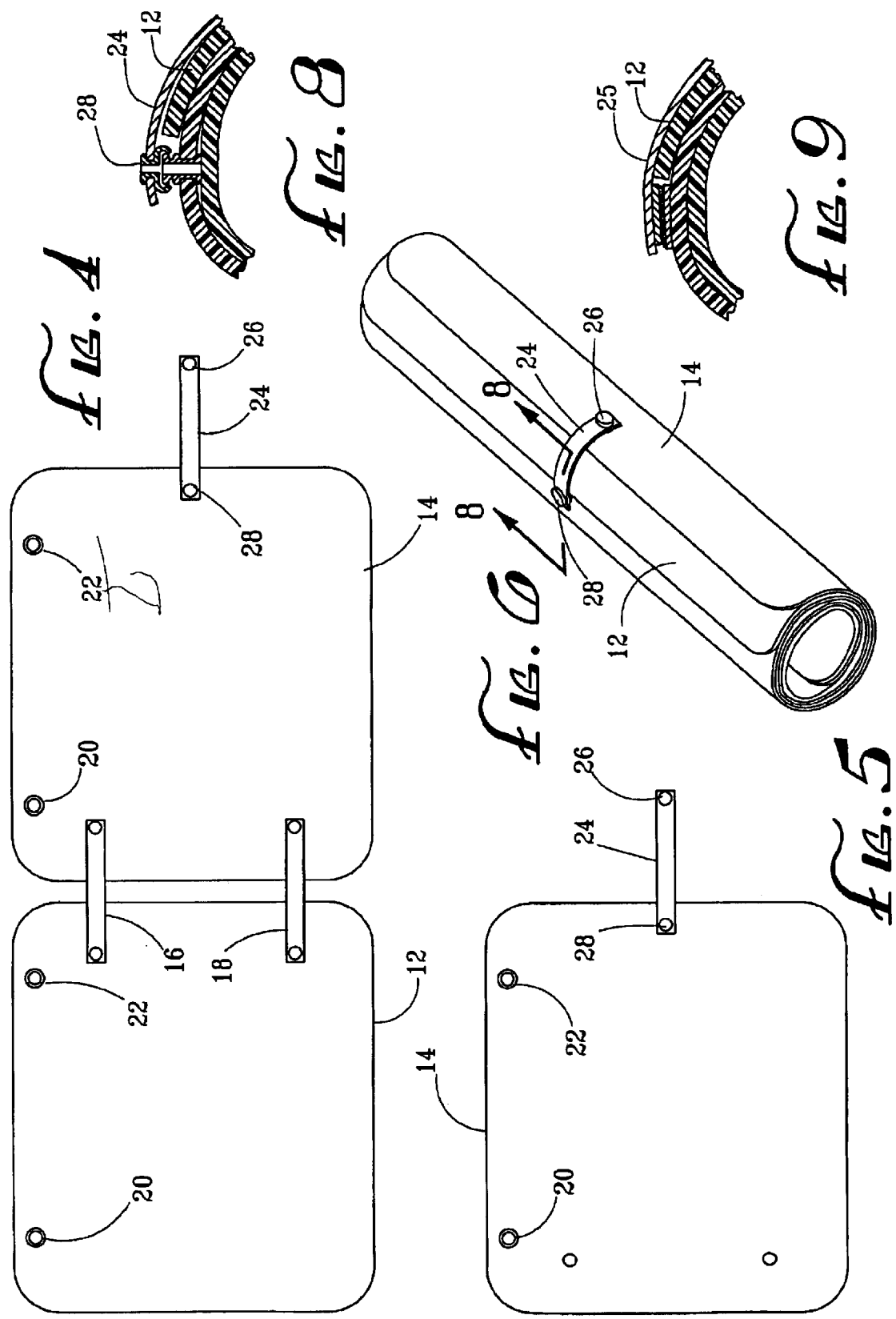

SHIELD PADS FOR VEHICLE DOORS AND SIDES

BACKGROUND AND SUMMARY OF THE INVENTION

The present invention provides protective shields to absorb impacts and prevent damage to vehicle doors and sides, which may typically be caused by impacts from doors of adjacently parked vehicles, particularly when such doors are opened with excessive force.

Protective shields or pads of the prior art for protection of vehicle sides and doors are characterized by a variety of shortcomings and defects. Many such devices are too expensive to manufacture to be appropriate for broad application to a general market. Some do not function adequately to protect sides and doors from dents and scratches, and many provide protection only to a limited area because of their relatively small size. Many require substantial time and effort to install, to remove, and to package and store.

According to the present invention, a removably attachable shielding is provided for vehicle sides and doors, which typically comprises two shield pads of impact-absorbing material to protect the doors and side surfaces of vehicles from impact dents and scratches, such as are caused by impacts by doors of adjacent vehicles. The shield pads are formed of impact-absorbing material, and are removably attached to a vehicle, typically by two suction cups on each pad.

At least one strap, and typically two straps, are attached to the lateral edge portions of the shield pads to attach them together. An elastic strap is secured at an edge portion of one pad and is detachably securable to the other pad by snap-fasteners having cooperating portions on each pad or by hook and loop fastener portions on the pads and on an end portion of the elastic strap, thus to provide for retaining pads when rolled up by the strap being secured thereabout. These features enable ease of handling, rolling up, storing, and maneuvering of the shield pads.

BRIEF DESCRIPTION OF THE DRAWINGS

FIG. 1 is a perspective view showing shield pads of the invention attached to the interior of a vehicle windshield by suction cups;

FIG. 2 is an elevational view of an automotive vehicle with two shield pads according to the invention attached to the doors and sides of the vehicle by suction cups on the pads;

FIG. 3 is a perspective view of the pads of FIGS. 1 and 2 rolled up together and secured by an elastic strap;

FIG. 4 is an elevational view of two shield pads attached together by straps;

FIG. 5 is an elevational view of a pad according to the invention with suction cups thereon and an elastic strap extending therefrom;

FIG. 6 is a perspective view of shield pads of FIG. 4 rolled up together and secured by an elastic strap;

FIG. 7 is an enlarged sectional view of a suction cup attached to a shield pad;

FIG. 8 is an enlarged sectional view taken at line 8—8 in FIG. 6, showing a snap fastener assembly utilized with the invention; and FIG. 9 is an enlarged sectional view taken at line 9—9 in FIG. 3, showing a hook and loop fastener utilized with the invention.

DESCRIPTION OF THE PREFERRED EMBODIMENT

The present invention relates to shields removably attached to vehicle doors and or sides to prevent dents and scratches which may typically be caused by the opening of doors of adjacent vehicles to impact a side or door of the vehicle.

Referring to the drawings, a preferred embodiment of the present invention comprises shields or pads 12, 14 which are interconnected by spaced-apart straps 16, 18 which are secured, as by riveting, to the shield pads, as shown (FIGS. 2 and 4). The shield pads are formed of impact-absorbing material which may comprise a blend of neoprene rubber, ethylene propylene, or styrene butatene rubber. A preferred material is ethylene vinyl acetate or "EVA".

Each shield pad has spaced-apart suction cups 20, 22 thereon for detachably mounting the shield panel on glass or painted metal surfaces of a vehicle. FIG. 7 shows a suction cup 20 in cross-section. An elastic band or strap 24 is secured, as by riveting, to a lateral edge portion of shield pad 14 and has on its outer end portion a snap-fastener member 26. A mating snap-fastener component 28 is disposed on the shield pad.

The elastic band 24 has at its outer end a snap-fastener component 26 engageable with a cooperating component 28, one component being male and the other female. The components cooperate to effect the wrapping and securing of the pads together. Alternatively, hook and loop fastener elastic band component 25 (FIG. 9) may engage end portions of the shield pads, and cooperate with hook and loop fasteners on the strap and on the shield pads. Rolled-up pads are thus secured together by the elastic band, thus to provide ease of handling, maneuvering and rolling up of the shield pads.

Each of the two shield pads may be used separately from the other shield pad by simply disengaging snap-fastener components of Velcro connections between the straps and shield pads end portions.

The shields of the invention may serve as sunshades when mounted on the windshield of a vehicle. The shield pads may typically be supported atop an instrument panel of a vehicle with the suction cups on their upper portions attaching the pads to the upper portion of the windshield, as indicated in FIG. 1. The visors adjacent to the vehicle windshield may also serve to retain the pads with or without utilizing the suction cups.

It will be understood that various changes and modifications may be made from the preferred embodiments discussed above without departing from the scope of the present invention, which is established by the following claims and equivalents thereof.

What is claimed is:

1. Removably attachable shielding to protect vehicle side surfaces and doors to prevent dents and scratches imposed by doors of adjacent vehicles, said shielding comprising:

two shield pads of impact absorbing material, at least one suction cup on each of said shield pads for removable attachment of the shield pad on a vehicle, at least one strap secured to a lateral edge portion of each of said shield pads to connect them together, said shield pads and suction cups are adapted and arranged for attachment to an interior surface of a vehicle windshield to serve as a sunshade, an elastic strap having an end thereof secured to an edge portion of a first one of the shield pads, and fastener means for detachably securing a second end portion of the elastic strap to retain a second one of the shield pads when the shield pads are rolled up together, whereby the protective shields are removably attachable to vehicle side surfaces and doors, and rollable up together.

2. Removably attachable shielding to protect vehicle side surfaces and doors to prevent dents and scratches imposed by doors of adjacent vehicles, said shielding comprising:

two shield pads of impact-absorbing material, at least one suction cup on each of said shield pads for removable attachment of the shield pad on a vehicle, two spaced-apart straps extending between and secured by lateral edge portions of the two shield pads, said shield pads and suction cups being adapted and arranged for attachment to an interior surface of a vehicle windshield to serve as a sunshade, an elastic strap having an end thereof secured to an edge portion of a first one of the shield pads, and fastener means for detachably securing a second end portion of the elastic strap to retain a second one of the shield pads when the shield pads are rolled up together, whereby the protective shields are removably attachable to vehicle side surfaces and doors, and rollable up together.

* * * * *